United States Patent [19]

Benoit et al.

[11] Patent Number: 4,969,407
[45] Date of Patent: Nov. 13, 1990

[54] CONTAINERIZED HAZARDOUS WASTE HOMOGENATE

[75] Inventors: Michel R. Benoit, Greene, R.I.; Eric R. Hansen, Shawnee, Kans.; Theodore J. Reese, Michigan City, Ind.

[73] Assignees: Cadence Chemical Resources, Inc., Michigan City, Ind.; Ash Grove Cement Company, Overland Park, Kans.

[21] Appl. No.: 463,389

[22] Filed: Jan. 11, 1990

Related U.S. Application Data

[60] Continuation of Ser. No. 347,075, May 16, 1989, abandoned, which is a division of Ser. No. 275,402, Nov. 23, 1988, Pat. No. 4,850,290.

[51] Int. Cl.$^5$ ............................................. F23G 7/04
[52] U.S. Cl. ................................. 110/346; 110/219; 110/238; 110/246
[58] Field of Search ............... 110/246, 236, 237, 238, 110/346, 349, 219; 44/50, 628

[56] References Cited

U.S. PATENT DOCUMENTS 3,572,524  3/1971  Muckenheim .
3,987,916 10/1976  Cates, Jr. et al. .
4,136,624  1/1979  Kato et al. .
4,315,712  2/1982  Seglias .
4,419,943 12/1983  Faurholdt .
4,785,745 11/1988  Hanni et al. .

OTHER PUBLICATIONS

"Hazardous Waste as Supplemental Fuel for Cement Kilns", Peters, Higgins & Chadbourne, *Proc. Natl. Waste Process Cong.*, 12th ed., 1986 (pp. 65–69).
"Burning Hazardous Waste in Cement Kilns", Chadbourne & Heltstetter, Presented at 76th Ann. Meeting of Air Pollution Control Assoc., Atlanta, GA, Jun. 19–24, 1983.

*Primary Examiner*—Edward G. Favors
*Attorney, Agent, or Firm*—Barnes & Thornburg

[57] ABSTRACT

A method is described for environmentally sound usage of combustible hazardous waste in an operating rotary kiln. The method is particularly adapted for disposal of solid hazardous wastes, optionally in the form of a blended waste homoenate, packaged in sealable containers. The containers are used as fuel modules and charged into a rotary kiln cylinder where kiln gas temperatures range from about 950° to about 1200° C. to achieve high destruction and removal efficiencies.

8 Claims, 2 Drawing Sheets

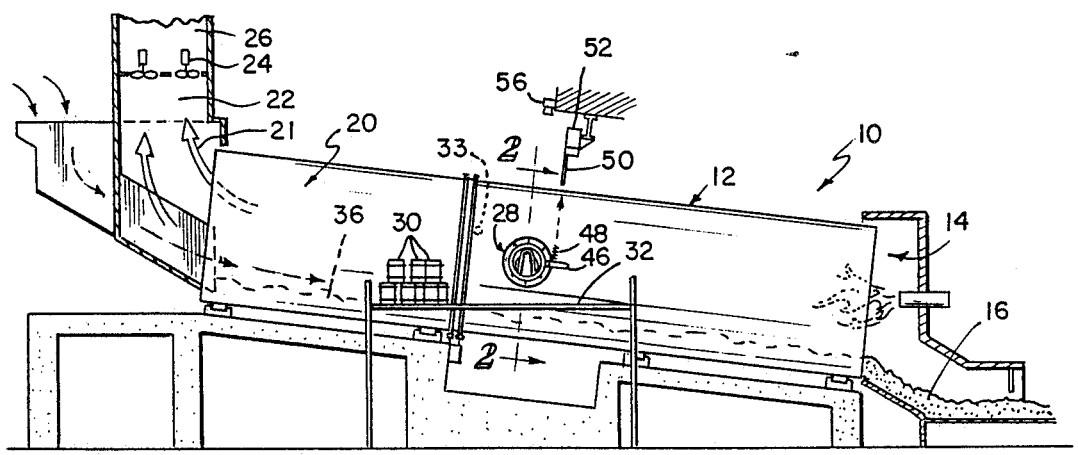
FIG. 1
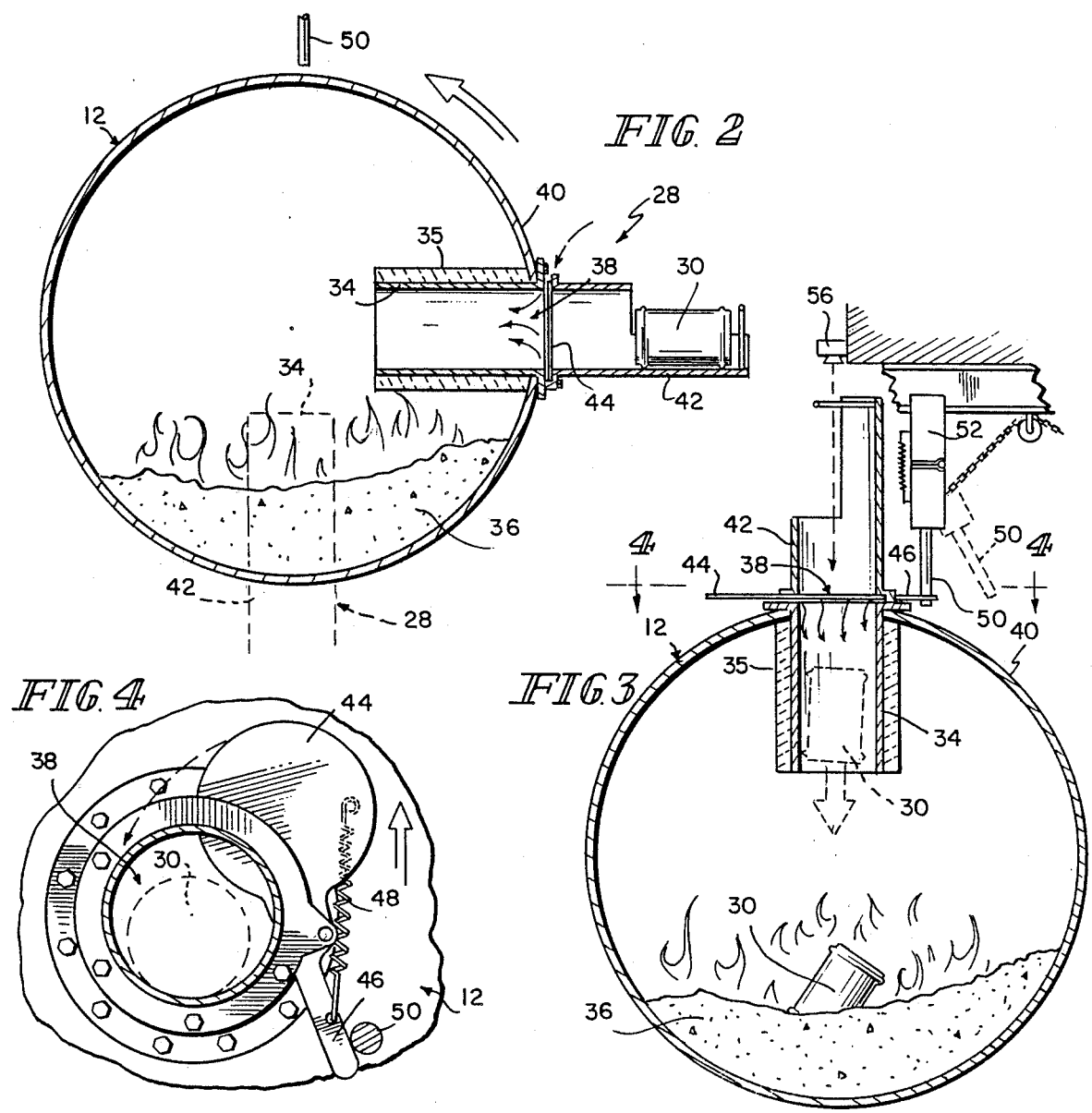

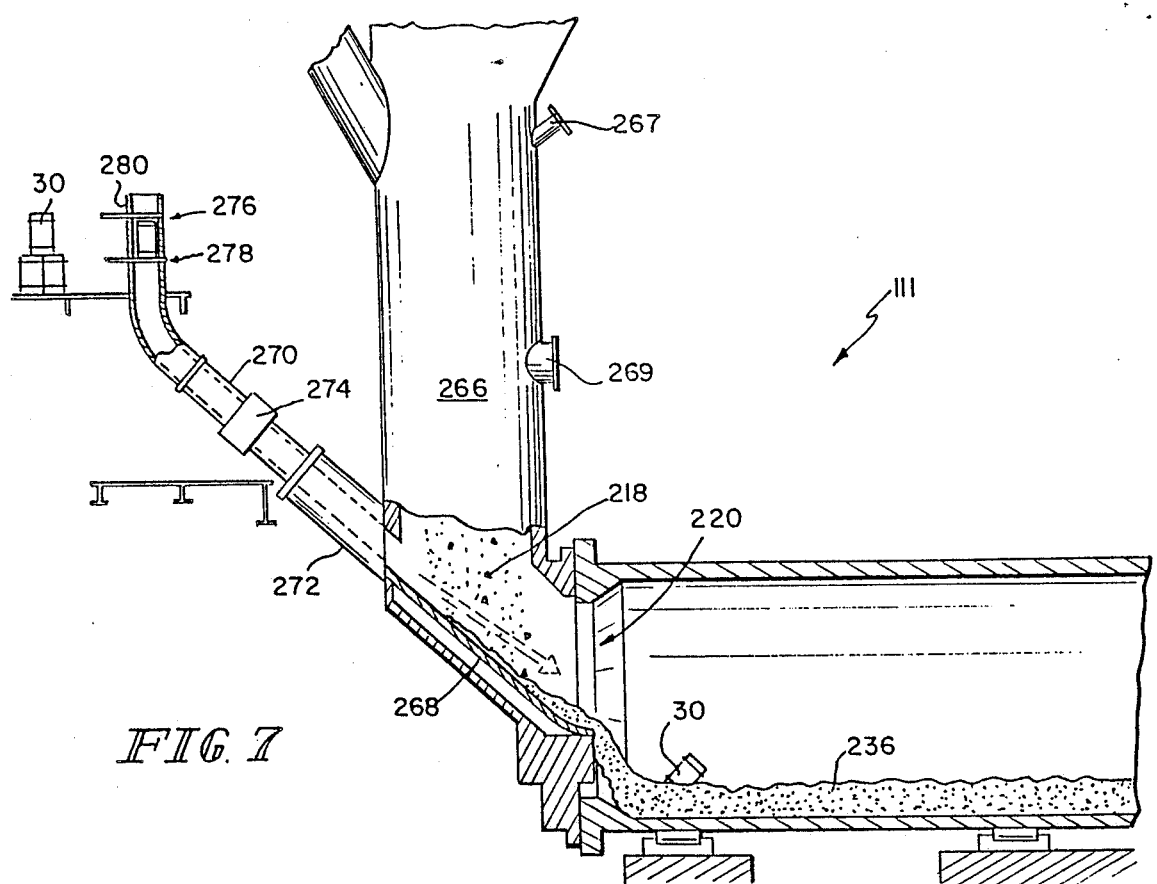
FIG. 7
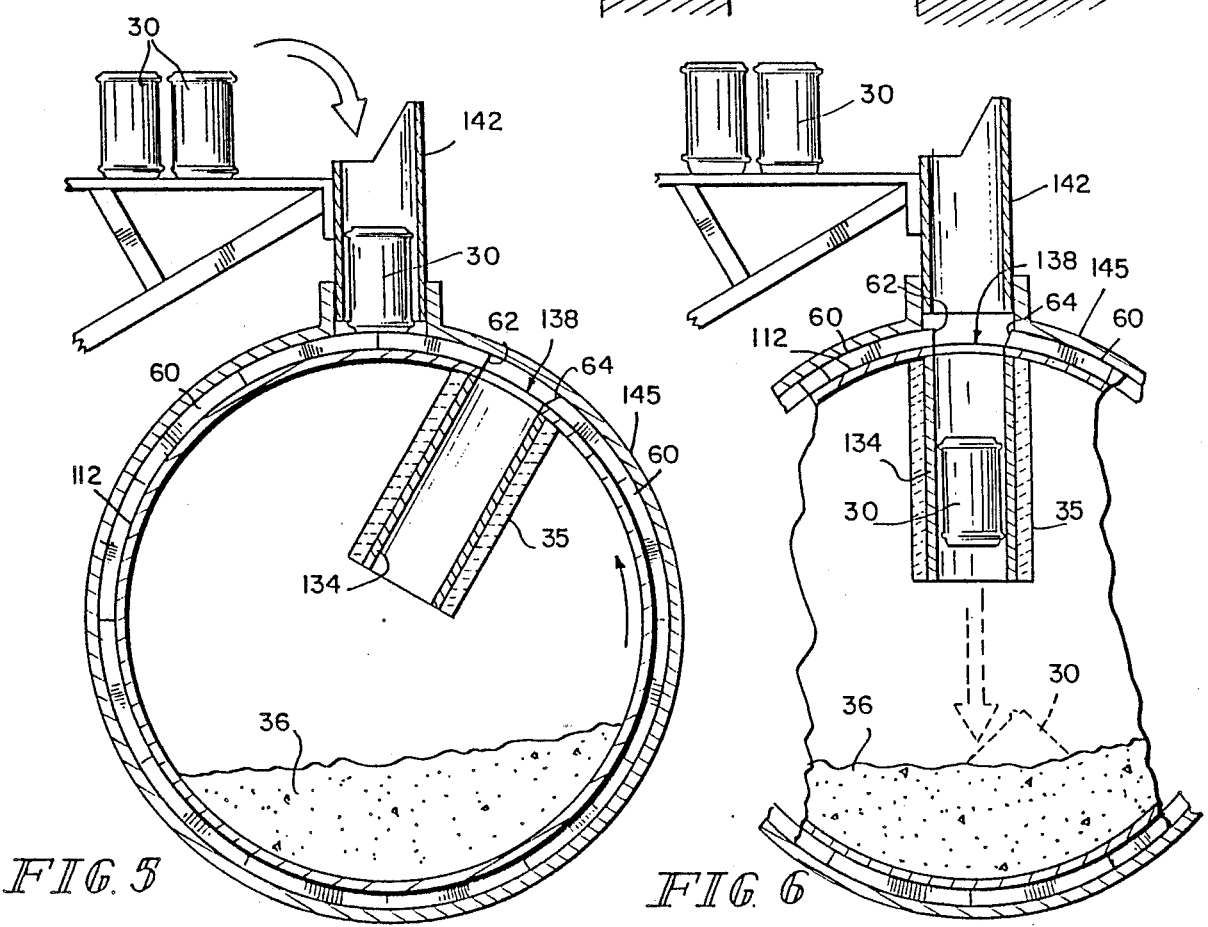
FIG. 5
FIG. 6

CONTAINERIZED HAZARDOUS WASTE HOMOGENATE

This is a continuation of application Ser. No. 07/347,075 filed May 16, 1989, which is a Division of application Ser. No. 07/275,402, filed Nov. 23, 1988, now U.S. Pat. No. 4,850,290.

FIELD OF THE INVENTION

The present invention relates to use of hazardous wastes in rotary kilns. More particularly, this invention is directed to a method for accomplishing environmentally sound disposal of hazardous wastes comprising combustible waste solids and to recover their available energy values in mineral processing kilns.

BACKGROUND AND SUMMARY OF THE INVENTION

Solid combustible wastes have always been generated by industry. Many of such wastes, because of their flammable or toxic character, are categorized by applicable environmental regulations as "hazardous wastes". Prior to governmental regulation of the disposal of such materials, they were disposed of by dumping in landfill operations. Significant environmental damage has been caused by those practices. With recently enacted environmental regulations imposing severe restrictions on landfill-type disposal of hazardous wastes, the only viable means for their safe disposal has been by thermal treatment, typically at high cost in specialized hazardous waste incinerators equipped with extensive emission control devices.

Cement kilns have received favorable review from both federal and state environmental regulatory agencies as providing ideal conditions for disposal of combustible waste materials. Not only does the burning of hazardous waste in operating kilns allow recovery of energy values from hazardous wastes, but also, because of their high operating temperatures, long residence times and their ability to provide favorable conditions for the chemical combination of inorganic residues into the active compounds of portland cement, such operations provide ideal conditions for environmentally sound disposal of combustible hazardous waste materials.

However, because of problems unique to the handling and burning of solid hazardous waste in operating kilns, regulation compliant disposal of hazardous wastes in operating kilns has been limited to combustible liquid or "pumpable" hazardous waste. Liquid waste materials are easily blended with each other and with conventional fuels to provide homogeneous liquids that can be burned in the gaseous phase at the firing end of the kiln with little or no modification of kiln burner configuration. Solid hazardous wastes, however, can occur in a multiplicity of forms, from hard crystalline solids to viscous, sticky sludges. They are not easily blended and they present significant engineering challenges for their safe handling and delivery into rotary kilns. Further, the burning of combustible solids in the firing chamber of a kiln faces other practical problems. Hazardous waste solids are not easily dispersed into the flame of the burning primary fuel. If waste solids are charged into the primary combustion zone, they will necessarily come into contact with the mineral bed at a very critical time in the clinker-forming process. It is important for the formation of quality clinker, both in terms of color and performance, that oxidizing conditions be maintained in the clinker-forming zone of the kiln. Charging combustible solids onto the forming clinker at temperatures in excess of 1300° C. can create reducing conditions in the forming clinker and adversely affect cement quality.

Before promulgation of existing EPA air quality regulations, it was a practice to charge combustible solid waste into the cold end of the kiln with the to-be-processed mineral materials. Such practices continue in countries where emission standards are not in effect or not enforced. Today, however, without added expensive emission control equipment, combustible solid hazardous waste cannot be charged to the cold end of the kiln and still allow the kiln to operate in compliance with environmental regulations controlling kiln emissions. Combustible solid hazardous waste by definition can contain a wide range of volatile organic substances. Combustible hazardous waste solids, added with the raw material to the "cold" or upper end of a conventional kiln, without combustion gas afterburners or other emission control equipment, results in unacceptable levels of hydrocarbon emissions. As the raw material and waste solids move down the kiln cylinder to higher and higher temperature zones, volatile components are driven off into the effluent gases at temperatures below those required for thermal degradation of the volatilized components. The result is discharge of a significant amount of the volatile compounds into the atmosphere. Particulate residue fuels with low volatiles content can be added either to the mineral material introduced at the cold end of the kiln or to the calcining zone with efficient energy value usage and apparently without notable problems with hydrocarbon emission levels. See, for example, U.S. Pat. No. 4,022,629 and references cited therein.

Combustible hazardous waste solids represent a significant potential source of inexpensive energy to the energy intensive mineral processing industry. However, concerns about waste handling, plant engineering, end-product quality and emission control has deterred kiln operators from taking advantage of the inexpensive energy values available through burning of hazardous waste solids. That has been true particularly in view of the availability of, and the environmentally sanctioned use of, hazardous waste liquids as inexpensive alternate fuels for kiln operations. However, with the promulgation of environmental regulations imposing severe restrictions on land disposal of solid hazardous wastes, and the limited availability (and high costs) of EPA-approved complete combustion facilities, there has been a significant effort directed toward the development of alternate means for safe disposal of solid hazardous wastes. The present invention evolved from that effort.

One object of this invention is to provide a safe, environmentally acceptable method for disposal of hazardous waste materials, including particularly hazardous waste solids, which contain significant levels of combustible and/or toxic organic compounds and toxic inorganic substances. It is another object of this invention to provide a method of recovering energy values of solid combustible hazardous waste materials and of using such materials to provide up to 40% or more of the energy requirements of kiln operation. The method is fully compliant with applicable environmental emission regulations, and it also allows for the most efficient use of the waste material as fuel in the process without compromising quality of the processed mineral product.

One aspect of the invention comprises a unique configuration of hazardous waste processing, packaging (containerization), and kiln charging techniques which enables kilns to use controlled quantities of hazardous wastes as supplemental fuel while maintaining compliance with environmental emission standards and minimizing the risk of personal injury to individuals handling of the waste products.

This has been practiced by preparing fuel modules of containerized hazardous wastes. Most preferably the hazardous waste is packaged in portions having energy values within a predetermined energy value range. The fuel modules are charged into an operating kiln at a point where the temperature and process conditions assure environmentally sound disposal of both volatile and non-volatile waste components and where energy and material content of the waste material most efficiently contribute to the mineral processing operation. Containers of the combustible hazardous waste are charged to the kiln at regular intervals at a point in the kiln where kiln gas temperatures range from about 950° to about 1200° C., more preferably from about 950° C. to about 1100° C. These temperatures are high enough to assure complete combustion of volatilized components but not so high that where the process is conducted in a mineral processing kiln, the presence of the combustible non-volatile portion of the charged waste in the mineral bed creates conditions detrimental to product quality.

One embodiment of the invention is an apparatus that enables the charging of solid fuel or containerized fuel through the wall of a rotating kiln cylinder. A port, preferably with a mechanical closure in the kiln cylinder wall is aligned with a drop tube inside the kiln cylinder. The drop tube prevents hot mineral material in the kiln from escaping through the port or contacting the closure. Fuel is delivered to the kiln through the port and the drop tube at predetermined times during kiln cylinder rotation.

Blending hazardous waste material to form hazardous waste homogenates prior to containerization facilitates process control and minimizes perturbation of kiln operation conditions by assuring some uniformity (from container to container) in terms of waste composition, form, energy value and combustion characteristics. Containerization of the hazardous waste, preferably as a hazardous waste homogenate, not only provides a safe and convenient means for handling and shipping of hazardous wastes, but it also seems to play an important role in the satisfactory degradation of the contained waste, particularly the volatile portion, in the kiln. Sealed containers of hazardous wastes are charged into the kiln at a point where kiln gas temperatures are high enough to decompose or complete combust volatile components driven into the gas stream. It is important that the volume of volatile components not exceed the capacity for their complete combustion in the gas stream. With the hazardous waste in sealed containers or modules, release of the volatile components of the contained hazardous waste into the kiln gas stream occurs over a period of time commensurate with the time for melting or disintegration of the container itself. Containerization of the waste therefore minimizes the potential for overloading the complete combustion capacity of the kiln gas stream with volatile organics. The result is a destruction and removal efficiency (DRE) of principal organic hazardous constituents (POHC's) of 99.99% and higher for the process.

Introduction of the containerized waste in the 950-1200° zone of the kiln not only assures acceptable complete combustion of volatile components but also enables efficient use and disposal of the non-volatile components. Combustible non-volatile components are burned while in contact with the calcining mineral material allowing for high heat transfer efficiency. The inorganic components of the non-volatile residue come into immediate contact with and react chemically with the free calcium oxide forming in the mineral bed to become incorporated into the cement materials and rendered non-hazardous.

BRIEF DESCRIPTION OF THE DRAWINGS

FIG. 1 is a schematic representation of a conventional rotary kiln equipped with the present fuel charging apparatus.

FIG. 2 is a cross-sectional view of the kiln cylinder taken along the line 2—2 of FIG. 1.

FIG. 3 is a cross-sectional view taken along line 2—2 of the kiln cylinder in FIG. 1 rotated about 90°.

FIG. 4 is a cross-sectional view of the fuel charging apparatus taken along the line 4—4 in FIG. 3.

FIG. 5 is similar to FIG. 2 illustrating an alternate embodiment of the charging apparatus.

FIG. 6 is a partial cross-sectional view of the apparatus shown in FIG. 5 with the kiln cylinder rotated about 30°.

FIG. 7 is a partial cross-sectional view of the upper end of a preheater/precalciner type kiln modified to carry out the inventive process.

DETAILED DESCRIPTION OF THE PREFERRED EMBODIMENT

This invention relates to a method for achieving environmentally sound disposal of combustible hazardous waste in an operating rotary kiln. Rotary kilns can be of the conventional type or of the so-called preheater or precalciner type. Common to each, however, is a heated, rotating cylinder containing in-process mineral material. In the widely used commercial process for the production of cement clinker, cement raw materials are calcined and "clinkered" by passing finely divided raw materials through a rotating inclined rotary kiln or kiln cylinder. The requisite temperatures for processing the mineral material are achieved by burning fuel such as gas, fuel oil, powdered coal and the like in the gaseous atmosphere at the lower end of the kiln with the gases moving countercurrent to the solids through the rotating kiln cylinder. With the high temperatures required for the process, fuel costs constitute a significant factor in the ultimate cost of the product. Presently fuel costs are often reduced through burning of pumpable liquid hazardous wastes, alone or in combination with conventional fuels.

In what is known as long dry or wet process kilns the entire mineral heating process is conducted in the rotating kiln cylinder. The cylinder is typically 10 to 12 feet or more in diameter and 300-500 feet in length and is inclined so that as the cylinder is rotated, raw materials fed into the upper end of the kiln cylinder move toward the lower "fired" end where the final clinkering process takes place and the product clinker is discharged for cooling and subsequent processing. Temperatures in the fired clinkering zone of the kiln range from about 1300° C. to about 1600° C. Gas temperature in the kiln decreases to as low as about 150°-200° C. at the upper mineral material receiving end of so-called wet process kilns. Somewhat higher gas temperatures exist in the upper end of dry process kilns.

Preheater or precalciner kilns have, in addition to the inclined rotating kiln cylinder fired at the lower discharge end, an apparatus for preheating or precalcining the mineral material before it is charged into the upper end of the rotating kiln cylinder. The kiln is typically much shorter than kiln cylinders in conventional long dry and wet process kilns. The gas temperatures inside the rotating kiln cylinder of a precalciner type kiln ranges from about 1300° to about 1600° C. at the fired discharge end to about 950°-1200° C. at its uppermost end.

In the present method, combustible hazardous waste, preferably combustible hazardous waste solids, are containerized and charged into the kiln to contact the mineral material at a point along the length of the kiln cylinder where the kiln gas temperatures ranges from about 950° C. to about 1200° C. In a conventional long dry and wet process rotary kiln, that range of gas temperatures is typically found in the kiln cylinder in a zone that corresponds approximately to the middle axial one-third portion of the kiln cylinder. In a preheater or precalciner type rotary kiln, the specified gas temperature ranges exist in about the upper one-third portion of the rotary kiln cylinder.

Hazardous wastes which can be charged to a kiln for disposal in accordance with this invention typically have volatile components, which are volatilized from the waste material as it contacts the hot mineral material, and non-volatile components comprising both combustible high molecular weight organic materials and non-combustible inorganic materials. It is critical to the environmental integrity of the present process that the volatile components entering the kiln gases are destroyed or complete combusted before being discharged from the kiln. Complete combustion of the volatile components is a function of gas temperature, residence time, and oxygen content. Thus, incomplete combustion evidenced by high hydrocarbon emissions or high carbon monoxide levels in the waste gas stream, could mean that the gas temperature at the point of complete combustion is too low, that there was insufficient oxygen to complete combustion either because of low kiln gas oxygen or because of unusually high volatile concentration, or insufficient residence time. It has been found that under normal kiln operating conditions where the hazardous waste is containerized and charged into the kiln where kiln gas temperatures are in a range from about 950° to about 1200° C., the process can be conducted consistently and continuously with a DRE of POHC's at 99.99% and higher.

Hazardous waste destruction efficiency of the process can be monitored as a function of carbon monoxide and/or total hydrocarbons in the effluent gas stream. Each kiln modified to carry out the present process can be calibrated, for example during a test burn of containerized solid hazardous waste, so that carbon monoxide concentration in exhaust gases can be utilized as a direct indication of the DRE of the ongoing process. Thus, for example, carbon monoxide concentration ranging from about 100-2000 parts per million can be determined to correspond to a defined range of hydrocarbon emissions. Continuous monitoring of effluent gases assures full compliance with applicable environmental regulations and consistent product quality.

"Environmentally sound disposal" as used in the description of the invention means disposal of the hazardous waste with a destruction and removal efficiency of principal organic hazardous constituents of at least 99.99% and correspondingly minimal emissions of other possible environmental contaminants. The hazardous waste materials that can be processed in accordance with this invention can be derived from a wide variety of industrial sources and can assume an equally wide range of forms and chemical composition. They can be in the form of hard solids, sludges, viscous tar-like residues, and often consist of high molecular weight organic resins. The term "hazardous waste" is intended to refer to those waste products designated as hazardous under applicable environmental regulations, particularly those that are so categorized because of their inherent toxicity and/or flammability or their content of toxic and/or flammable materials. While the process is particularly adapted to destruction of combustible hazardous waste solids, volatile constituents of typical solids are readily tolerated and safely and effectively complete combusted in the process.

It is contemplated that this process finds application, too, for thermal treatment of soils contaminated with toxic and/or combustible hazardous compounds.

The hazardous waste materials are containerized for safe shipment and handling and for complete combustion control of volatile constituents in the process. Further, to facilitate control of kiln operating conditions, it is preferred that hazardous waste materials for use in the process be collected, optionally categorized so that hard solids can be comminuted and blended with other hazardous waste materials to form a hazardous waste homogenate. Individual lots of hazardous waste homogenates can also be categorized in terms of ash content, volatiles, halogen content and energy value per unit weight. Portions of the waste homogenate are then packaged into sealed containers adapted to be charged into a rotary kiln in accordance with the present disposal process utilizing, for example, the charging apparatus illustrated in FIGS. 1-4. Each container is filled to contain an amount of hazardous waste or hazardous waste homogenate so that each container has an energy value within a predetermined energy value range and then sealed. Thus, a specific example was a 1000-container lot of "fuel modules" for use in this invention that had an energy value (heat of combustion), including that of the container itself, of 300,000 to 500,000 BTU. The resulting container-to-container consistency in combustion properties and energy values facilitated process control for production of a mineral product within specifications and promoted the maintenance of kiln operating conditions appropriate for environmentally sound disposal of the hazardous waste materials charged into the process.

One form of hazardous waste which has been successfully utilized in this process is a by-product of the production of liquid waste fuels already marketed by Cadence Chemical Resources under the name CHEM FUEL ® for burning in kiln operations. The solid hazardous waste by-products consist of the non-volatile and non-extractable residues which consist principally of high molecular weight resins, polymers and residual volatiles. Preferably the hazardous waste containerized for use in the present process should have a BTU value of greater than 5,000 BTU/lb. Free liquids in the solid waste materials should be minimized. If present, they may be absorbed using an organic absorbent material such as ground corncobs or similar BTU contributing material.

Sealable containers for the hazardous waste should be fully compliant with applicable Department of Transportation standards for containment/shipment of hazardous waste materials. Sealable steel pails or drums are preferred. The container contributes both energy (iron is oxidized in the higher temperature zones near the discharge end of the kiln) and material (iron oxides) to the process chemistry. Other containers such as fiber and plastic may also be used. The size of the containers are dependent on the energy value of the hazardous waste targeted for disposal and the capacity of the kiln to receive such containers.

In a representative embodiment of the invention a homogenate of hazardous waste solids having a minimum energy value (heat of combustion) of 6,000 BTU/lb, a chlorine content of less than 6.66% and PCB's at less than 50 ppm is packaged in six-gallon steel pails conforming to DOT Specification 17H or 37A. The pails are open head containers with sealable lug-type covers. The pails are 26 gauge steel bodies and lids for net contents of less than 60 lbs. and 24 gauge steel bodies and lids where the net weight of the contents is greater than 60 lbs. and less than 80 lbs. The combustible waste material is filled into the pails which are then sealed and the gross weight of each pail is marked on the lid. Each pail is then marked with the necessary labels and markings to conform with DOT, state and other regulations. It is desirable that the homogeneity of the hazardous waste material be such that there not be more than 3,000 BTU/lb difference between containers in any given lot of containers.

Performance of the present method for achieving environmentally sound disposal of combustible hazardous waste in conventional long dry and wet process kilns is achieved by a novel charging apparatus comprising a port in the wall of the kiln cylinder, a drop tube extending from the port into the kiln cylinder and positioned so that the mineral material in the kiln will not pass through the port or contact the port closure during rotation of the kiln cylinder, means for receiving the fuel and positioning same for passage through the port, and means for applying a force to said containerized fuel sufficient to move the fuel from the receiving and positioning means through the port and drop tube and into the kiln cylinder. Preferably a closure is provided for the port along with means for actuating the closure to open and close the port at predetermined times during rotation of the kiln cylinder.

FIG. 1 illustrates a conventional long dry and/or wet process kiln 10 having kiln cylinder 12 with lower fired end 14 where processed mineral material 16 is discharged from cylinder 12. Mineral material is charged to the upper end 20 of kiln cylinder 12 and moves down kiln cylinder 12 as it is rotated about its axis at a rate of about 1 to about 3 times per minute. Exhaust gases from kiln 10 may be treated to remove particulates at emission control station 22 utilizing bag filters or electrostatic precipitators (not shown). The flow of gases through kiln cylinder 12 is controlled by blowers 24 which direct the exhaust gases through stack 26. A solid fuel charging apparatus 28 is located at approximately the mid-point of kiln cylinder 12.

Fuel modules 30 are located on elevated platform 32 from which they are loaded into charging apparatus 28 as the kiln cylinder 12 rotates. A thermocouple 33 is located about 10 to about 50 feet downstream (uphill) from charging apparatus 28 to monitor gas temperature in kiln cylinder 12.

Referring to FIG. 2, charging apparatus 28 consists of drop tube 34 extending into the kiln cylinder a distance greater than the maximum depth of mineral bed 36. Drop tube 34 communicates with port 38 in wall 40 of kiln cylinder 12. Port 38 also communicates with fuel receiving chute 42. Fuel receiving chute 42 is designed so that when fuel module 30 is received in chute 42, fuel module 30 is positioned in alignment with port 38.

With reference to FIGS. 2 and 3, closure 44 is provided for port 38. Pivoted lever 46 is provided for actuating closure 44 between a port-opened position (FIG. 3) and a port-closed position (FIG. 2). Closure 44 is biased in the closed position by spring 48 cooperating with lever 46. Lever 46 is positioned so that as kiln cylinder 12 rotates to a point where port 38 is near its highest position during rotation of kiln cylinder 12, lever 46 contacts fixed cam 50 through a predetermined arc of rotation of kiln cylinder 12 to move lever 46 from the biased port-closed position to the port-opened position so that fuel module 30 falls with force of gravity from receiving chute 42 through port 38 and drop tube 34 and onto mineral bed 36. As the kiln cylinder 12 is rotated past the position where the fuel module 30 is transferred into the kiln cylinder, lever 46 moves past cam 50 and the closure returns to its biased port-closed position. Cam 50 is positioned on cam mount 52 which can be moved from an apparatus-operating position (shown in FIG. 5) to a position where cam 50 does not contact lever 46 during rotation of kiln cylinder 12.

Closure 44 is positioned relative to port 38 and sized so that when it is in the port-closed position, clearance is allowed for air flow into kiln cylinder 12 under the influence of negative pressure in kiln cylinder 12 effected by blowers 24. Air flow through port 28 around closure 44 and into kiln cylinder 12 through drop tube 34 helps to cool closure 44 and drop tube 34. Air temperature in kiln cylinder 12 in the vicinity of drop tube 34 ranges from about 950° C. to about 1200° C. Drop tube 34 must be constructed of a material which can withstand those thermally harsh conditions over long periods of time. It is preferably constructed of an alloy material protected by refractory 35. One alloy found suitable for construction of the drop tube 34 is an alloy sold by Duralloy Blaw-Knox under the trademark SUPER 22-H. ® That alloy is a patented high strength alloy designed for service to 2250° F. (1230° C.). Its stated chemical composition is as follows: nickel, 46–50%; carbon, 0.40–0.60%; chromium, 26.0–30.0%; manganese, 1.50% max.; silicon, 1.75% max.; tungsten, 4.00–6.00%; molybdenum 0.50% max.; cobalt, 2.50–4.00%; sulfur, 0.04% max.; and phosphorus 0.04% max.

Sensor 56 is positioned to detect transfer of fuel module 30 through port 38 and into kiln cylinder 12. An audible or visible signal is generated to indicate that the transfer is complete.

In operation, fuel module 30 is loaded from elevated platform 32 into kiln cylinder mounted fuel receiving chute 42 as it passes elevated platform 32. As kiln cylinder 12 is rotated and fuel receiving chute 42 approaches a near vertical position, fixed cam 50 contacts pivoted lever 46 moving closure to the port-opened position allowing fuel module 30 to drop through port 38 and drop tube 34 and onto mineral bed 36. As kiln cylinder continues its rotation and pivoted lever 46 moves past fixed cam 50, the closure is returned to the port-closed position by action of spring 48 on pivoted lever 46.

With reference to FIG. 5 there is illustrated a second embodiment of a fuel module charging configuration. Drop tube 134 communicates with port 138 and extends radially inwardly into the kiln cylinder. Fuel receiving chute 142 is stationary and mounted immediately above the rotating kiln cylinder. Stationary fuel receiving chute 142 is positioned so that it comes into alignment with port 138 and drop tube 134 once on each revolution of kiln cylinder 112. A fuel module retaining rail 60 is mounted circumferentially on the exterior of kiln cylinder 112 at an axial position in alignment with both port 138 and stationary fuel receiving chute 142 and having rail termini 62, 64 at opposite edges of port 138 so that when fuel module 30 is positioned in receiving chute 142 it rides on retaining rail 60 until rail terminus 62 of retaining rail 60 clears fuel module 30 at a point where receiving chute 142, port 138 and drop tube 134 are in alignment, and fuel module 30 falls under the force of gravity through port 138 and drop tube 134 onto the mineral bed as is shown in FIG. 6. Fuel module retaining rail 60 and port 138 are enclosed in fixed annular housing 145 which helps to control air infiltration into kiln cylinder 112 through port 138. As kiln cylinder 112 rotates and rail terminus 64 clears the fuel receiving chute 142, the next fuel module can be transferred to receiving chute 142.

With reference to FIG. 7, fuel modules 30 can be delivered directly into the mineral bed 236 in the upper end 220 of rotary kiln cylinder 212. In normal operation, mineral material is preheated by the heat contained in the exhaust gases. In precalciner operations, fuel is added to the riser duct 266 and combusts either with excess air in the kiln gas or additional air provided through a separate duct 269. The energy released by this combustion is absorbed by the mineral material before entering the kiln. This preheated mineral material travels down a duct parallel to the fuel module delivery tube 270 and then down ramp 268 and into upper end 220 of inclined rotating kiln cylinder 212 where thermal processing of the mineral material is completed as it moves down rotating kiln cylinder 212. A fuel module delivery tube 270 is installed at the upper end of ramp 268 at the base of preheater/precalciner riser duct 266. Delivery tube 270 has a ceramic lined portion 272 proximal to the base of the riser duct 266 and is equipped with master gate valve 274 and upper and lower gate valves 276 and 278, respectively, operated during the fuel module loading procedure. The delivery tube is configured so that a fuel module entering the base of riser duct 266 through delivery tube 270 has sufficient momentum to carry it quickly down ramp 268 and onto the mineral bed 236 in upper end 220 of rotary kiln cylinder 212. Fuel modules are charged into the kiln through delivery tube 270 at predetermined intervals ranging from about 30 seconds to about 2 minutes usually one every 60 seconds.

In operation, a fuel module is delivered to the kiln by the following procedure. With lower gate valve 278 closed, upper gate valve 276 is opened and fuel module 30 is loaded into upper end 280 of delivery tube 270. Upper gate valve 276 is closed and at the predetermined time, lower gate valve 278 is opened to allow fuel module 30 to fall down delivery tube 270 across ramp 268 and onto mineral bed 236.

It is contemplated that waste fuel modules could also be delivered into the upper portion of the kiln cylinder of a precalciner type kiln utilizing, for example, the charging apparatus illustrated in FIGS. 2–4. The apparatus can be positioned at a point, along the upper one-third portion of the rotary kiln cylinder where the kiln gas temperatures range from about 950° to about 1200° C., more preferably between about 950° C. and 1100° C.

Measurements of destruction and removal efficiency and particulate emissions has already been conducted on a precalciner rotary kiln having a construction substantially as illustrated in FIG. 7. A test burn was conducted in which 10% of the process energy came from solid hazardous waste derived fuel introduced in steel containers onto the mineral bed in the upper end of the rotary kiln cylinder. The tests were conducted with a specially prepared surrogate waste derived fuel spiked with chlorinated hydrocarbons. The containerized fuel was fed into the process at a rate of 3900 lbs/hr. The destruction and removal efficiency was found to be well in excess of 99.99% in all tests.

Comparable results were obtained in a conventional long dry and wet process rotary kiln (12'×450') fired at the rate of 150–250 million BTU's per hour of coal, gas or liquid hazardous waste derived fuel. During a test burn a specially prepared surrogate waste derived fuel enriched in paint pigments, to give maximum heavy metal input, and spiked with at least 5% trichlorobenzene was used. The principal component of the solid waste was high molecular weight non-volatile polymers and resins obtained as a by-product of the production of liquid hazardous waste derived fuel. The waste blend was packaged in 24 gauge steel pails with sealable lug-type covers and were introduced to the mid-point of the rotary kiln cylinder at a rate of one (1) container per minute. At 5% trichlorobenzene, the POHC input rate was about 3.25 lbs/minute. During the test burn, the concentrations of carbon monoxide, nitrogen oxide, oxygen and sulfur dioxide in the exit gases were monitored as well as mineral material feed rate, fuel rate, kiln speed, and gas temperatures at various points along the length of the kiln cylinder. Throughout the test run, the gas temperature was monitored by a thermocouple 12 feet downstream (uphill) of the point of introduction of the waste fuel modules. This temperature was maintained above 925° C. at all times. Preliminary data collected during the test burn predicts a DRE providing a high margin of safety for environmentally sound destruction of solid hazardous waste.

What is claimed is:

1. A method for preparing hazardous waste material comprising solid waste for environmentally sound disposal by thermal degradation, said method comprising the steps of blending the hazardous waste material to form a hazardous waste homogenate, and packaging portions of said homogenate into containers, said containers of waste homogenate being adapted to be charged into a rotary kiln.

2. The method of claim 1 wherein the containers are sealed metal containers.

3. The method of claim 1 wherein the sealed container is of a fiber construction.

4. The method of claim 1 wherein the portion of hazardous waste homogenate in each sealed container is sized to have an energy value within a predetermined energy value range.

5. A fuel module for a rotary cement kiln consisting essentially of containerized hazardous waste homogenate prepared in accordance with the method of claim 1.

6. A fuel module for a rotary cement kiln consisting essentially of containerized hazardous waste homogenate prepared in accordance with the method of claim 4.

7. The method of claim 1 wherein the hazardous waste homogenate consists essentially of solid waste.

8. The method of claim 4 wherein the hazardous waste homogenate consists essentially of solid waste.

* * * * *